Nov. 7, 1933.      H. F. MESSMER      1,934,439
NUT LOCK
Filed April 15, 1931
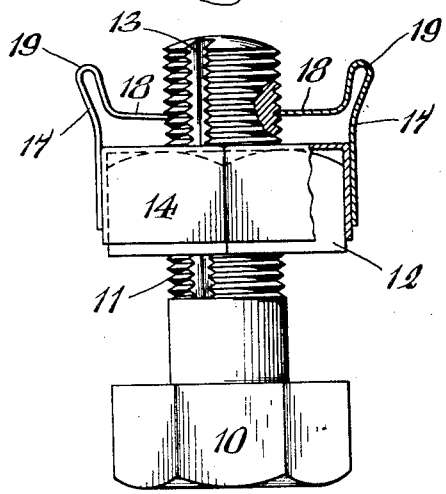
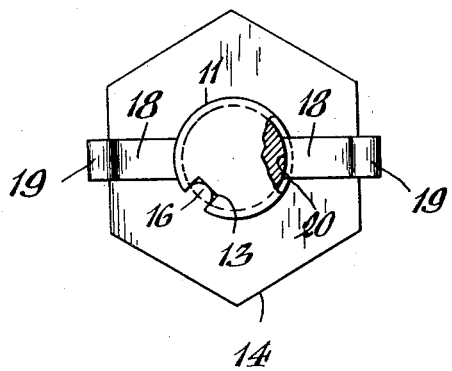
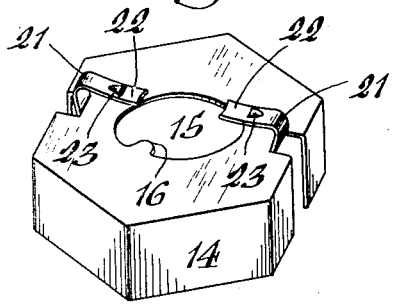
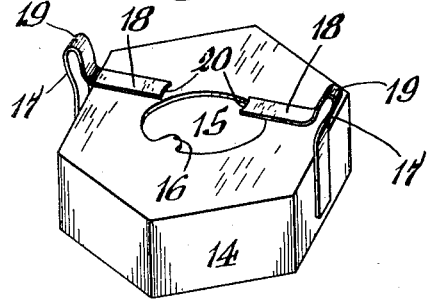
Inventor
Herman F. Messmer,
by Walter P. Geyer
Attorney.

Patented Nov. 7, 1933

1,934,439

UNITED STATES PATENT OFFICE 1,934,439

NUT LOCK

Herman F. Messmer, Buffalo, N. Y.

Application April 15, 1931. Serial No. 530,197

1 Claim. (Cl. 151—29)

This invention relates to improvements in nut locks or devices for preventing the relative displacement of a nut from a bolt.

One of its objects is the provision of a simple and inexpensive nut lock which can be easily applied or removed and yet be positive in its locking action.

Another object of the invention is to provide a nut lock which is so designed that it is self-locking, that does not in any way interfere with or limit the adjustment of the nut on the bolt, and further to provide a nut lock which does not require any special type of bolt or nut, other than that the shank of the bolt has a longitudinal groove or keyway.

In the accompanying drawing:—

Figure 1 is a sectional side elevation of my improved nut lock in position on a bolt. Figure 2 is a top plan view thereof, the bolt being partly in section to show one of the yieldable jaws interlocking with the bolt-threads. Figure 3 is a detached perspective view of the nut lock shown in Figures 1 and 2. Figure 4 is a perspective view of a slightly modified form of the nut lock.

Similar characters of reference indicate corresponding parts throughout the several views.

Referring now to the drawing, 10 indicates a standard bolt having a threaded shank 11, and 12 the nut applied thereto. The bolt-shank has a longitudinal groove or keyway 13 therein which preferably extends the full length of the threads, as seen in Figure 1.

The locking device for preventing escapement of the nut from the bolt preferably consists of a cap-like member 14 shaped to fit over the nut 12 in the manner shown in Figure 1, the same being provided in its top with an opening 15 to freely receive the shank of the bolt. Extending into this opening for engagement with the keyway 13 of the bolt is a radially disposed key or projection 16, which prevents turning of the nut and cap relatively to the bolt. At diametrically opposite sides of the cap-like member 14 are releasable gripping elements which are designed to interlock with the threads at the exposed end of the bolt for preventing displacement of the cap-like member from the bolt in its nut-locking position. These gripping elements are preferably in the form of arms or tongues 17, which in the embodiment of the invention shown in Figures 1, 2 and 3, are welded or otherwise secured to the side faces of the cap 14, these arms projecting upwardly from the cap and terminating in opposing, yieldable jaws 18 which are disposed radially of the cap-opening 15 for movement toward and from the bolt-axis to releasably interlock with one or another of the threads 11 of the bolt, in the manner depicted in Figure 1. To facilitate the release or disengagement of the jaws from the bolt when desired, these arms are preferably provided with loop-like finger pieces 19 which may be grasped readily for shifting the jaws outwardly from their locked position. As seen in Figures 2 and 3, the gripping edges of the jaws 18 are curved, as indicated at 20, to conform to the curvature of the bolt-shank and assure a wide bearing or gripping surface with the bolt threads.

In the modified form of the invention shown in Figure 4, the gripping elements or arms are shown formed in one piece or stamped from the cap member 14. This may be accomplished by making parallel slips in the diametrically opposite sides and adjoining top portion of the cap to provide resulting tongues 21 which terminate at their free ends in jaws 22 for engagement with the bolt-threads in the manner previously described. For the purpose of releasing the jaws from their gripping position, they may be provided with finger grips or shoulders 23 which may be stamped up from the gripping arms in the manner shown.

In the use of this nut lock, the nut is first screwed tightly home after which the cap 14 is slipped over the exposed end of the bolt shank with its key 16 in sliding engagement with the keyway 13 of the bolt, the depending walls of the cap encircling or embracing the nut in the manner seen in Figure 1. In sliding the cap over the bolt, the resilient arms 17 may be spread to clear the bolt-threads and when the cap is in its embraced position on the nut, the arms may be released, permitting the jaws to interlock with the registering thread of the bolt. In this position, the nut is positively held against turning and the nut locking cap is firmly held in place and it is not liable to jar loose from vibrations or other external forces.

When it is desired to release the nut lock to enable the nut to be removed from the bolt, the finger pieces 19 are grasped with the hands or a suitable spreading tool and the jaws spread clear of the bolt thread, thereby enabling the cap 14 to be quickly and easily removed from the bolt.

I claim as my invention:—

A nut lock, comprising a bolt having a longitudinal key-way therein, a cap-like nut-engaging member having a bolt-receiving opening in its top and a key projecting radially into the same for engagement with the key-way of the bolt, and opposing yieldable jaws formed integrally with said cap-like member and each including an inwardly-facing radial portion movable toward and from the bolt-axis and having its terminal edge disposed substantially concentric with the bolt for releasable interlocking engagement with the bolt-threads and an intermediate finger-gripping portion for effecting the release of the jaws from the bolt-threads.

HERMAN F. MESSMER.